(12) United States Patent  
Meyer et al.

(10) Patent No.: US 8,533,586 B1  
(45) Date of Patent: Sep. 10, 2013

(54) ANNOTATION OVERLAY COLLECTION, STORAGE, AND DISPLAY SYSTEM AND METHOD

(75) Inventors: Marc A. Meyer, San Francisco, CA (US); Jean Sini, San Carlos, CA (US)

(73) Assignee: Twelvefold Media Inc., San Francisco, CA (US)

( * ) Notice: Subject to any disclaimer, the term of this patent is extended or adjusted under 35 U.S.C. 154(b) by 1791 days.

(21) Appl. No.: 11/458,382

(22) Filed: Jul. 18, 2006

Related U.S. Application Data

(60) Provisional application No. 60/700,140, filed on Jul. 18, 2005.

(51) Int. Cl.
 *G06F 17/24* (2006.01)
(52) U.S. Cl.
 USPC .......................................... 715/230; 715/232
(58) Field of Classification Search
 USPC ................................................ 715/230–233
 See application file for complete search history.

(56) References Cited

U.S. PATENT DOCUMENTS

| | | | |
|---|---|---|---|
| 5,893,126 A * | 4/1999 | Drews et al. | 715/203 |
| 6,262,728 B1 * | 7/2001 | Alexander | 345/440.1 |
| 6,687,878 B1 * | 2/2004 | Eintracht et al. | 715/201 |
| 2002/0054059 A1 | 5/2002 | Schneiderman | |
| 2003/0018632 A1 | 1/2003 | Bays et al. | |
| 2003/0023679 A1 * | 1/2003 | Johnson et al. | 709/204 |
| 2003/0204490 A1 * | 10/2003 | Kasriel | 707/2 |
| 2005/0065958 A1 | 3/2005 | Dettinger et al. | |
| 2005/0125447 A1 | 6/2005 | Cragun et al. | |
| 2005/0132281 A1 | 6/2005 | Pan et al. | |
| 2006/0005117 A1 * | 1/2006 | Yamashita et al. | 715/512 |
| 2009/0125597 A1 * | 5/2009 | Carr et al. | 709/206 |

\* cited by examiner

*Primary Examiner* — Adam M Queler  
(74) *Attorney, Agent, or Firm* — Cooley LLP (57) ABSTRACT

An annotation overlay collection, storage, and display system and method is described. The system and method allows the collection of annotations of a variety of formats from multiple users and stores these annotations separate from, but related to the reference document, or several related reference documents. The annotations are displayed when the reference document is viewed and may be displayed in a format that minimizes the use of display real-estate but allows access to the annotation when desired.

12 Claims, 8 Drawing Sheets

ANNOTATION CLIENT STRUCTURES

*Active Space Table (AST)*

— 2.1

*Client Space Table (CST)*

— 2.2

ANNOTATION SERVER STRUCTURES 1.10

*Spaces Table (ST)*

— 2.3

*Auth*

*Annotation Table (AT)*

— 2.5

*Annotation Type Table (AType)*

ANNOTATION OVERLAY COLLECTION, STORAGE, AND DISPLAY SYSTEM AND METHOD

CROSS-REFERENCE TO RELATED APPLICATIONS

This application claims the benefit of priority from Provisional Patent Application No. 60/700,140, "Process and method for the augmentation of computerized documents with individual and group annotations, the layering of services onto these documents, including the collection and display of these annotations and services in a novel user-interface, and the automated collection of the augmented content into one or more derived documents." filed Jul. 18, 2005, which is incorporated herein by reference in its entirety.

STATEMENT REGARDING FEDERALLY SPONSORED RESEARCH AND DEVELOPMENT

Not Applicable.

REFERENCE TO A MICROFICHE APPENDIX

Not Applicable.

BACKGROUND OF THE INVENTION

1. Field of the Invention

This invention relates to a system and method for providing the augmentation of computerized documents providing text and numbers, drawings, photographs, or other media, with annotations from individuals or groups; the collection and display of these annotations is associated with a particular computerized document or multiple computerized documents, and the retention of these annotations separate from, but associated with the particular computerized document; and a user interface providing a clear, but non-distracting, display presence of the annotations associated with a computerized document, and providing a simple annotation retrieval action.

In this application a computerized document is defined as the collection of information that is displayed on a computer screen with a user interface, called a browser, that allows the user to display and interact with text, images, and other information or media typically located on a web page at a website on the World Wide Web or a local area network. Reference to a computerized document in this application may include use of the abbreviated term "document" or the term "reference document." Also, in this application, an annotation may be one or more referenced Web-accessible document formats or some subpart thereof that are related by a user to the computerized document.

2. Description of Related Art

Systems for the collection, storage, and display of annotations are known in the art. U.S. Patent Application Publication Number 2003/0018632 (Bays et al.) describes a computer program to collect, store, and search annotations on database files based on categories of the annotation and the associated file. U.S. Patent Application Publication Number 2002/0054059 (Schneiderman) describes a method and system to collect and store annotations used to search an electronic image database. U.S. Patent Application Publication Number 2005/0065958 (Dettinger et al.) describes a method of associating an annotation with a database entity so as to exchange information using the annotation. U.S. Patent Application Publication Number 2005/0125447 (Cragun et al.) describes a method of relating an annotation with a variety of database entities. U.S. Patent Application Publication Number 2005/0132281 (Pan et al.) describes a method of storing annotations in a shared directory and relating them to particular documents in a database. All of these documents provide for the annotation of database-related files. An annotation system that provides for the annotation of a computerized document is needed.

SUMMARY OF THE INVENTION

This invention is a system and method to provide the association of notes, drawings, video, services, application capabilities, customized services, advertising, or other value-added community targeted activities, or other annotation formats with computerized documents. These annotations may be based on the locations, names, type, or content of the computerized document by either an individual, a group, or programmatically. This allows customized "views" of the referenced material contained in the annotations, and augments the navigation of the space of the computerized document with the space of the annotations' content and structure for both browsing and searching.

Annotations are displayed together with the material they reference, in order to provide an integrated browsing experience, without the mental context switching among various views common in other annotation systems. In the preferred instantiation, annotations are semi-transparent and overlaid on the content they annotate, until the user's mouse enters the annotation, when the annotation becomes opaque to allow easy interaction with it. The annotation may also be collapsed to occupy a minimal size, moved around within or outside the frame of the referenced material or made to disappear altogether.

Annotations, in the preferred instantiation, and when they are not of a type that "sticks" to particular content in a document, float above the document, unaffected in their position by panning and scrolling of the document.

The visual placement of annotations overlaying a computerized document may be changed by the user. In addition to traditional methods of accomplishing this, we introduce a user-interface process whereby an annotation can be fixed to a visual position on a document by "burying it" which is done by dragging the annotation and then "wiggling it" just before releasing the mouse or mouse-like device. The burying of an annotation provides an indication of the annotation in a fixed place in the document. When the user interacts, the display of annotations, buried or unburied, is as contemporaneous as the referenced documents.

Our method permits the layering of content-related services and other annotations, including advertising, on top of and across documents provided by one or more similar data providers. It also allows the collection of related annotations automatically into site-views, where the annotations may be accessed and navigated in as a centralized collection, and this allows the merging of many annotations spaces, possibly filtered by additional criteria, into an individualized perspective on the set of annotated references referred to by all the annotations.

Groups of annotations can be shared among individuals or groups of users according to any of the social sharing metaphors well-known in the art, including but not limited to by invitation using email, instant messenger, subscriptions, or other communications, by access to a shared login and password or a customized URL (universal resource locator). Such annotation spaces serve as a medium for communication and information sharing, as well as a destination for the attention of groups of users.

The particular annotations which an individual sees for a given reference document will be customized to that individual's interests by their belonging or subscribing to some spaces of annotations, and not to others. Further restricting who sees any given annotation is performed on the basis of authorization information entered by the author of the annotation, and the authors of spaces into which the annotation is placed.

Objects and Advantages

One object of this invention is to provide an annotation system and method in which the annotations are stored separate from the document, but are presented in an integrated fashion with the document.

A second object of this invention is to provide an annotation system and method that shows annotations are available in ways that don't require extra computer screen space such that they are not a distraction when they're not being viewed, but their presence is clearly visible, so they are easy to deal with when the user does want to interact with the annotation.

A third object of this invention is to provide an annotation system and method that stores and retrieves annotation material that can be any kind of programmatically displayable content.

A fourth object of this invention is to provide an annotation system and method that allows annotation content to be viewed contemporaneously, thus preventing a "mental context-switch" on the user's part, when dealing with references and annotations, and allowing the viewing of the referred material and the commented material as one whole entity.

A fifth object of this invention is to provide an annotation system and method that allows the annotation to be found and displayed by accessing the reference document, rather than requiring access to a separate annotation space to find the annotation material.

A sixth object of this invention is to provide an annotation system and method that automatically retrieves applicable annotations when a document is viewed.

A seventh object of this invention is to provide an annotation system and method that may refer to multiple reference documents, and appear when any of these is referenced, allowing inter-reference navigation or the finding of related items easily and naturally.

An eighth object of this invention is to provide an annotation system and method that provides a listing of (zero or more) referenced documents when an annotation content is viewed.

Figure 5:
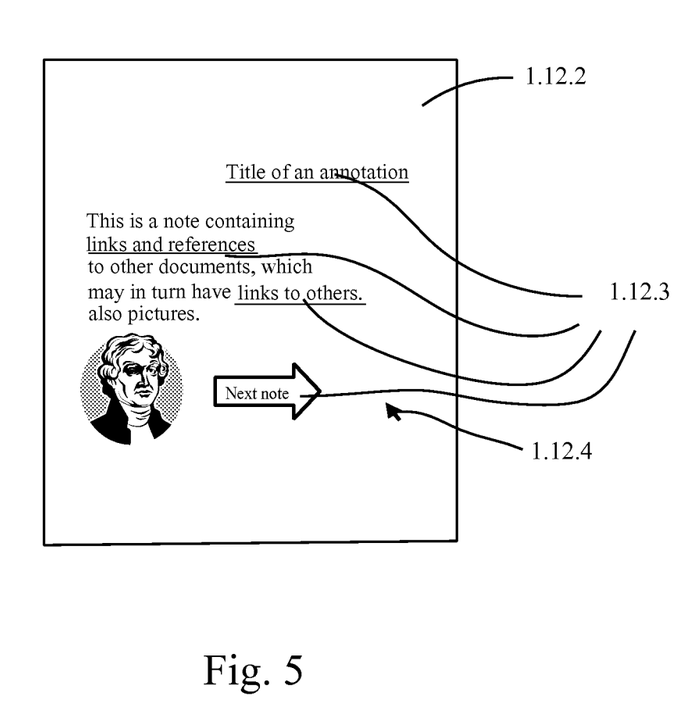
FIG. 5 is an illustration of the access from annotations to multiple referenced documents, and also illustrates a "slide show."

A ninth object of this invention is to provide an annotation system and method in which the annotations may be chained together by explicit reference, by being the results of a search, by subject matter, by order, or chronologically, so that navigating the space of annotations creates a "slide-show" of the referenced documents, along with the corresponding annotations. Thus the annotation may bring together information and/or annotation-based services, generated by a user, a community, or programmatically, from various different sources and applicable to the references. This is shown in FIG. 5.

Figure 6:
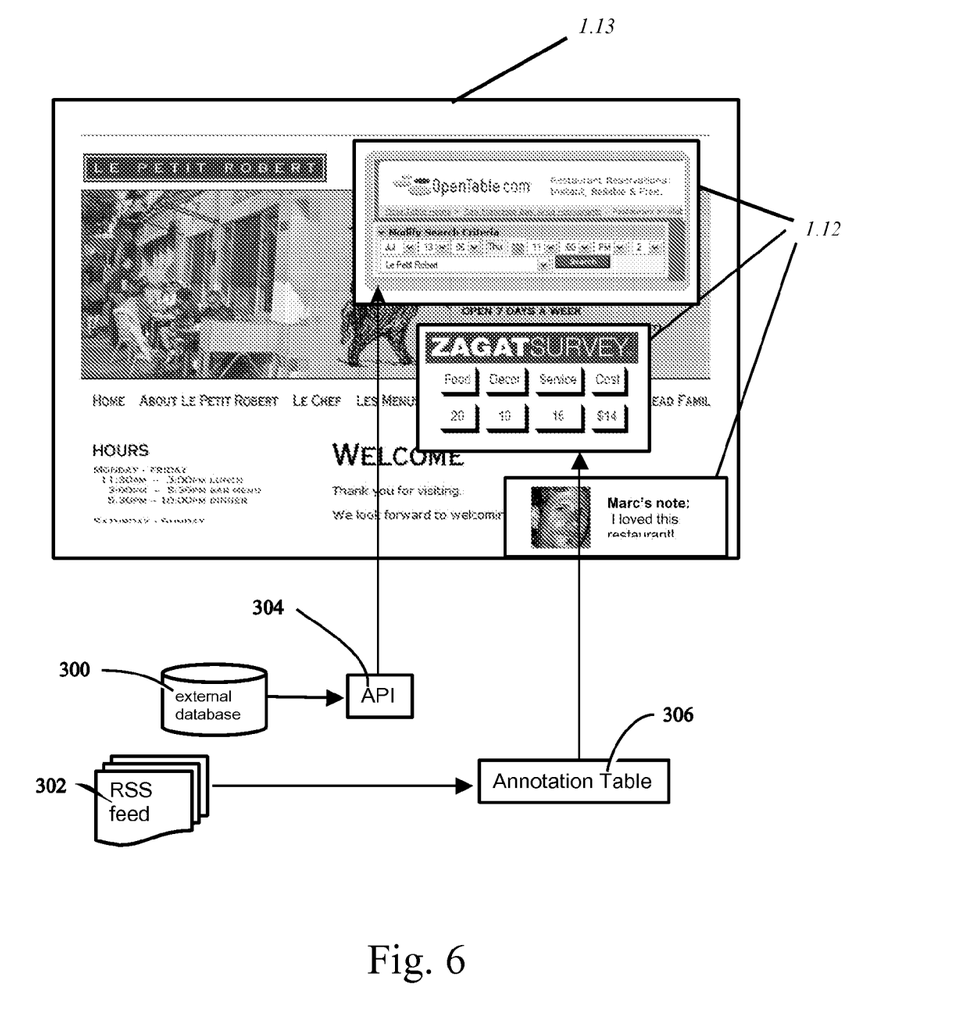
FIG. 6 is a flowchart illustrating layering "services" using annotations and annotations imported from external sources.

A tenth object of this invention is to provide an annotation system and method in which annotations and services built upon them can be layered onto reference data to which the user has access and rights, but for which the annotation or service provider may not have access or permission to use commercially. See FIG. 6.

An eleventh object of this invention is to provide an annotation system and method that is a simple way of adding a capability to all the data in a class of reference documents. For example, a restaurant reservation service may be added to an annotation of a restaurant review site.

A twelfth object of this invention is to provide an annotation system and method that provides annotations that may contain content and services derived from a separate database or provider. For example, the restaurant reservation service described above could actually be provided through access to an API for a commercially available restaurant reservation service. See FIG. 6.

A thirteenth object of this invention is to provide an annotation system and method that provides annotation types that can be tailored to the type of reference, such as a type defined by the references format, its location or the provider of the reference. Such an annotation type may span several providers, and provide a "glue" of services or capabilities accessible across several reference providers. For example, the above reservation service could span documents served by several restaurant review sites, as well as sites for the restaurants themselves. See FIG. 6.

A fourteenth object of this invention is to provide an annotation system and method in which the types of annotations and annotation-based services is extensible by updating the client side of the annotation system and therefore serves as an application-deployment platform.

A fifteenth object of this invention is to provide an annotation system and method in which collections of annotations may be searched in an integrated fashion along with their references documents to enhance the ability to find matching documents. Thus a document may be found just as easily by its content or its annotation.

A sixteenth object of this invention is to provide an annotation system and method in which collections of annotations may be viewed as a single complex document, such as a website, with corresponding high-level functions and all the advantages as a commercial and social portal of a targeted destination site. In this application this termed a site-view. Site views for annotation spaces are created by this invention automatically, with potential for customization for look and feel, as well as the adding of customized interaction features.

A seventeenth object of this invention is to provide an annotation system and method in which the mechanism of buried and unburied user-displayable elements applied to annotations allows the user to both easily place general user-displayable elements in a location convenient to the user, and also to both place and have placed "buried" user-displayable elements in places specific to the document in question.

BRIEF DESCRIPTION OF THE SEVERAL VIEWS OF THE DRAWINGS

A more complete understanding of the present invention can be obtained by considering the detailed description in conjunction with the accompanying drawings, in which.

REFERENCE NUMERALS IN DRAWINGS

Figure 2A:
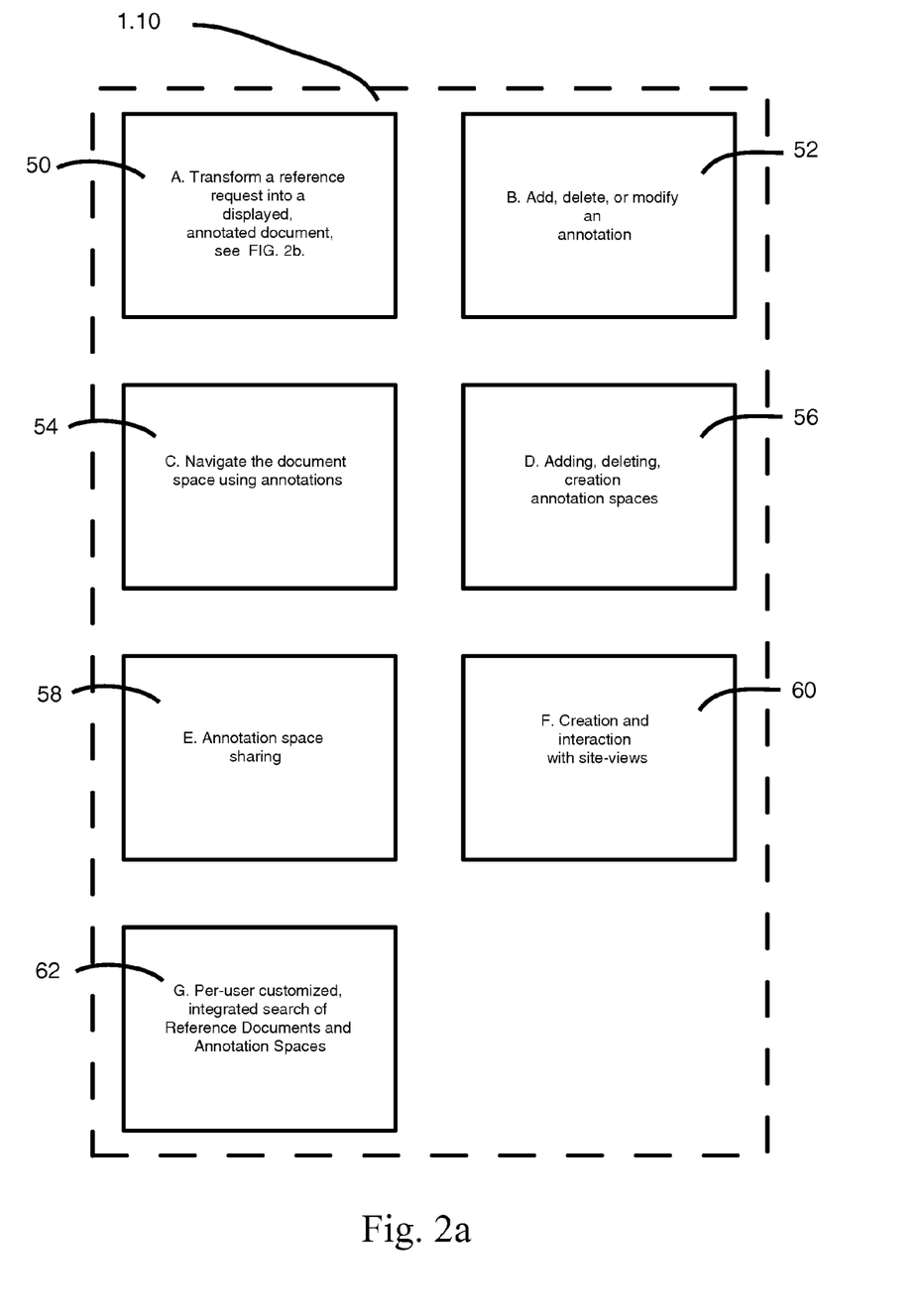
FIG. 2a is a schematic diagram showing the mechanisms implemented in the invention.
Figure 2B:
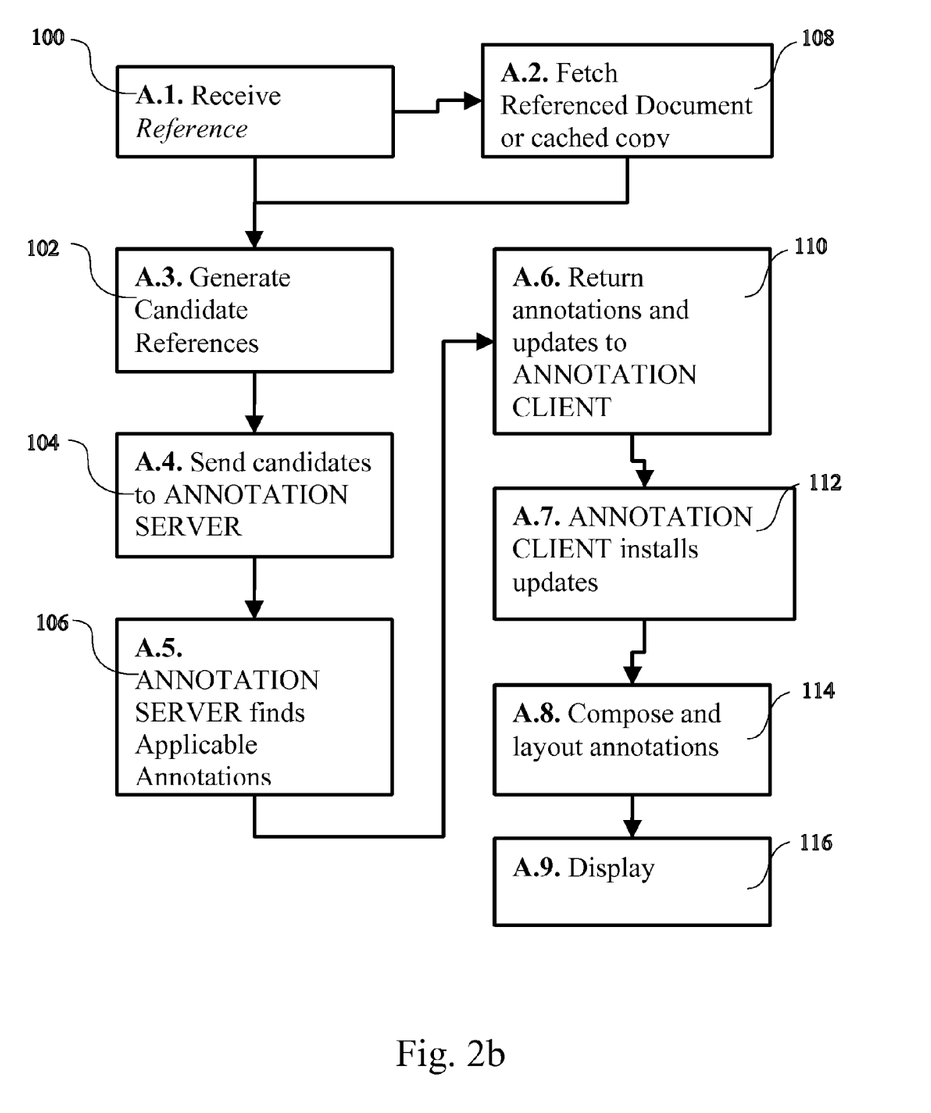
FIG. 2b is a flowchart of the method of resolving a reference to an annotated document.

These reference numbers are used in the drawings to refer to areas or features of the invention.
- 1.1 COMPUTER SYSTEM(S)
- 1.2 TYPICAL COMPUTER SYSTEM BOUNDARY
- 1.3 BROWSER
- 1.4 ANNOTATION CLIENT
- 1.5 RENDERER
- 1.6 ANNOTATION HELPER
- 1.7 ANNOTATION RENDERER
- 1.8 DOCUMENT SERVER
- 1.9 USER
- 1.92 User Computer
- 1.10 ANNOTATION SERVER
- 1.11 WEB SERVER
- 1.12 ANNOTATION(s)
- 1.12.1 transparent ANNOTATION
- 1.12.2 opaque ANNOTATION
- 1.12.3 Links to Referenced Documents
- 1.12.4 MOUSE CURSOR
- 1.13 REFERENCE DOCUMENT(s)
- 1.14 DISPLAY
- 1.15 DATABASEDETAILED DESCRIPTION OF THE INVENTION
- 2.1 ACTIVE SPACES TABLE
- 2.2 CLIENT SPACE TABLE
- 2.3 SPACE TABLE
- 2.4 AUTHORIZATION TABLE
- 2.5 ANNOTATIONS TABLE
- 2.6 ANNOTATIONS TYPE TABLE
- 50 Transform a reference request into a displayed, annotated document, see FIG. 2b.
- 52 Add, delete, or modify an annotation.
- 54 Navigate the document space using annotations
- 56 Adding, deleting, creation annotation spaces
- 58 Annotation space sharing
- 60 Creation and interaction with site-views
- 62 Per-user customized, integrated search of Reference Documents and Annotation Spaces
- 100 Receive Reference
- 102 Generate Candidate References
- 104 Send Candidates to ANNOTATION SERVER
- 106 ANNOTATION SERVER finds Applicable Annotations
- 108 Fetch Referenced Document of Cached Copy
- 110 Return Annotations and Updates To ANNOTATION CLIENT
- 112 ANNOTATION CLIENT Installs Updates
- 114 Compose and Layout Annotations
- 200 User Starts Annotation Drag
- 202 Buried?
- 204 Modification Authorized?
- 206 Annotation Will Not Drag
- 208 Annotation Drags
- 210 Buried Release
- 212 Modification Authorized?
- 214 Simple Move: UI Feedback Other Unburied Annotations Move Also
- 216 Buried move: UI Feedback, Bury Annotation, Update Annotation at ANNOTATION SERVER
- 300 External Database
- 302 RSS Feed
- 304 API
- 306 Annotation Table

DETAILED DESCRIPTION OF THE INVENTION

Figure 1:
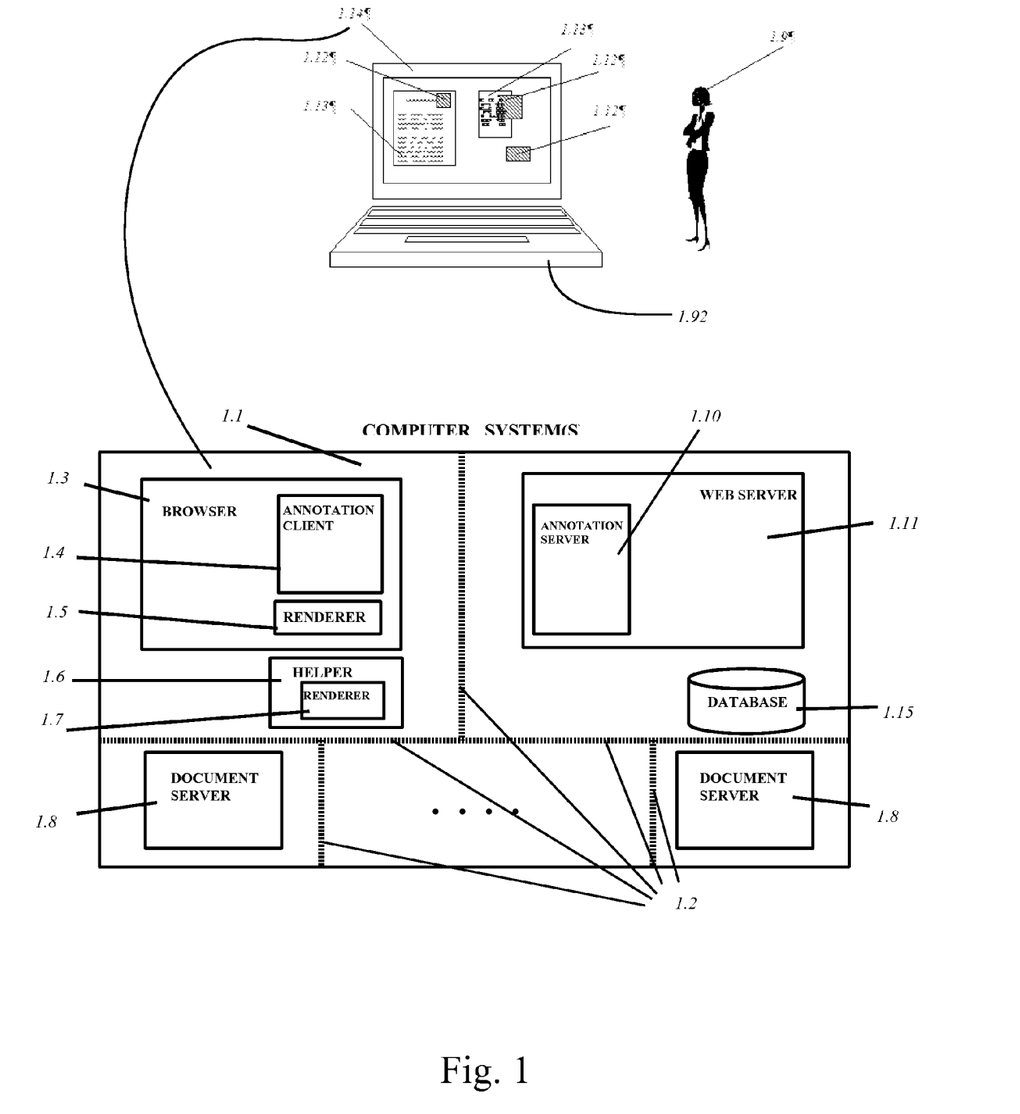
FIG. 1 is a schematic diagram showing the components of the invention.

FIG. 1 shows the components making up the invention. The USER (1.9) is a human (or a computer through an API) providing initial or subsequent inputs to the invention. One or more COMPUTER SYSTEMS (1.1) host the remaining components, which communicate with one another using well-known computer communications methodologies, such as function-call and return, ActiveX, DLL linking or other inter-process-communication (IPC) mechanism, both within and between the COMPUTER SYSTEMS (1.1) involved, possibly over a network. In the preferred instantiation, the components are distributed across several computer systems, as indicated by the BOUNDARIES (1.2), and these systems are connected over the Internet. Typical COMPUTER SYSTEMS might include, but are not limited to Windows, Linux, or Macintosh PCs or mainframes attached to the Internet.

The USER (1.9) communicates via keyboard, mouse, and DISPLAY (1.14) or other equivalent human-interaction devices, or via IPC, with a BROWSER (1.3), which is in charge of mediating the fetching and displaying of REFERENCED DOCUMENTS (1.13). In the preferred instantiation, the BROWSER (1.3) is a Web Browser, such as, but not limited to Safari, Internet Explorer, Netscape Navigator, Firefox, but could alternately be a collection of specialized programs intended to view the documents to be annotated. The BROWSER (1.3) will have access to a RENDERER (1.5) to generate the final visual representation of the resulting annotated document and drives the output display. In a typical instantiation, the RENDERER (1.5) is an HTML or XHTML renderer and controller built into the BROWSER (1.3). An optional ANNOTATION HELPER (1.6) including its own customized ANNOTATION RENDERER (1.7) may be used to render and control the ANNOTATIONS (1.12).

An ANNOTATION CLIENT (1.4) is attached to the BROWSER (1.3) by an API (Application's Programming Interface) such as but not limited to the extensions or toolbar mechanisms in current web browsers. The ANNOTATION CLIENT receives and mediates information on the requested REFERENCE DOCUMENTS (1.13), and the ANNOTATIONS (1.12), and ensures they are rendered and controlled by the RENDERER (1.5) or the ANNOTATION HELPER (1.6) and ANNOTATION RENDERER (1.7). The ANNOTATION CLIENT contains an ACTIVE SPACE TABLE 2.1 and CLIENT SPACE TABLE 2.2, shown in FIG. 7 and FIG. 8.

The BROWSER (1.3) uses well-established methods to find and fetch REFERENCE DOCUMENTS (1.13) from the DOCUMENT SERVERS (1.8) on which they reside. Typically, these are standard Web servers such as, but not limited to, Apache, and are connected via the internet to the BROWSER (1.3). Alternately, they may be specialized document servers, such as Microsoft Sharepoint Servers, or general file servers such as NFS or local file systems. The REFERENCE DOCUMENTS (1.13) are named by location, using the appropriate syntax for the type of document. This can be a file system namespace identifier for a local file-system, a URL (universal resource locator) for a Web-accessible document, or another syntax supported by the DOCUMENT SERVER (1.8) containing the REFERENCE DOCUMENT (1.13). We use the term URL flexibly here to refer to any of these types of addresses. The method where by such resource requests are directed to and satisfied by such servers is well-known in the art.

Figure 7:
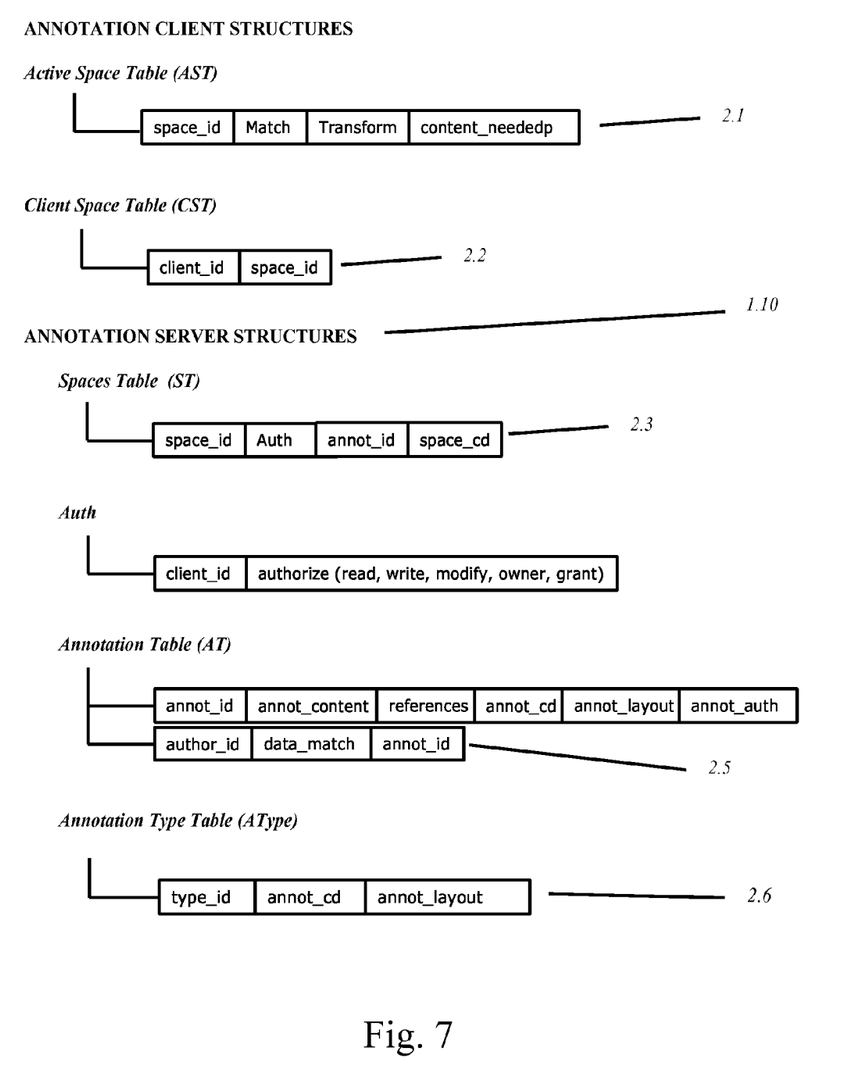
FIG. 7 is an illustration of the client and server structures and data fields.

The ANNOTATION CLIENT (1.4) requests and obtains ANNOTATIONS (1.12) for the REFERENCE DOCUMENT (1.13) from the ANNOTATION SERVER (1.10), which may itself be a part of a WEB SERVER (1.11). The ANNOTATION SERVER (1.10) stores and retrieves data it needs in a DATABASE (1.15), which contains a SPACES TABLE (ST) (2.3), an AUTHORIZATION table (AUTH) (2.4), an ANNOTATIONS table (AT) (2.5) and a ANNOTATIONS TYPE (Atype) table (2.6) as shown in FIG. 7.

The REFERENCED DOCUMENTS (1.13) and ANNNOTATIONS (1.12) are displayed on the DISPLAY (1.14) or transmitted via IPC in their pre-display formats if the USER is actually a request by a program through an API. Mechanisms for this, for example passing HTML documents over an API, are well established in the art.

Operation

A high level description of the operation of the various components of the invention follows. The operations are broken down in more detail in the next section.

A computer system such as a Windows PC or a Macintosh, perhaps attached to a network, runs a program serving to access and view computerized documents, which we call a BROWSER (1.3). The BROWSER (1.3) may be a web browser such as but not limited to Safari, Firefox or Internet Explorer, or it may be a collection of specialized programs intended to view the documents in question.

An ANNOTATION CLIENT (1.4) and an ANNOTATION HELPER (1.6) is are installed on this computer and interact with the browser. The ANNOTATION CLIENT includes facilities for customizing what data from the reference page being viewed is passed to the ANNOTATION SERVER (1.10) in order to find relevant annotations, as shown in FIG. 2B, 102, 104 and 106, and is detailed in methods A.3, 4 and 5. In typical implementations these components might be a mix of javascript and java code, running as an extension or a plug-in to the BROWSER (1.3). They may also include other programs and services running independently in the operating system, communicating through the file system and/or through inter-process communication (IPC) provided by the operating system.

An ANNOTATION HELPER and ANNOTATION RENDERER do not form a part of the BROWSER, but can access third-party renderers through well-known mechanisms such as MIME in order to render an extensible list of formats in annotations.

An ANNOTATION SERVER (1.10) services requests for annotations, and runs as part of, or in collaboration with, a WEB SERVER 1.11, such as Apache or IIS, uses permanent storage such as a DATABASE (1.15) like MySql or Oracle, or some custom variety thereof, or directly in a file system.

The ANNOTATION SERVER (1.10) may be found at a well-known address or through the use of existing directory services. A standard protocol may be used to ensure that the server is an authorized provider of the technology described here. Multiple servers may be in use at once, and the addition of servers to the known list may be done from the client side. These will also be authenticated to ensure authorization.

The system maintains and delivers the association of annotations (Anno) with web-accessible documents or parts thereof, called references (Ref). Annotations can be as simple as a piece of unstructured text, or as complex as a HTML, video, multi-media content, or executable code, either compiled or scripted in a language such as, but not limited to, javascript. Annotations are classified into annotation types (Atype).

Annotations belong to one or more annotation spaces (S), an association also maintained by the system. Spaces are categorized into space types (Stype).

For each space S, the system also maintains one or more sites (W), according to website generation rules (Wg). These are websites or dynamically created documents collecting annotations from that space and providing functionality over them.

In this document, rules may be arbitrary programs operating on any data available to them.

Annotations are delivered to a browser when the item they are associated with, called a reference item or reference document, is requested by or delivered to the browser as a result of normal browsing operations.

The invention delivers these annotations to the user. In the preferred instantiation, the annotations are delivered inside the browser. The system also provides tools along with the annotation to navigate among the annotations.

The annotations are also collected by the system into one or more site representations. These are generated automatically by the system, by placing the annotations according to one or more site templates associated with the type of site space.

An-accessible document is considered to be something that can be addressed and shown inside a browser, including, but not limited to an html or xml document.

In the preferred instantiation, an annotation refers to one or more referenced Web-accessible documents or some subpart thereof.

When a BROWSER (1.3) fetches a Ref, the ANNOTATION CLIENT (1.4) makes a request, synchronously or asynchronously, to the ANNOTATION SERVER (1.10), identifying the Refs to which annotations could be attached.

The ANNOTATION SERVER (1.10) finds in the DATABASE (1.15) all annotations that match the components identified, using matching rules.

Annotations along with any programmatic code needed for their composition and display, and general code needed to update the ANNOTATION CLIENT (1.4) and ANNOTATION HELPER (1.6) and ANNOTATION RENDERER (1.7), are returned to the ANNOTATION CLIENT (1.4), which composes the annotations, decides how to display them and uses the RENDERER (1.5) or the HELPER RENDERER (1.7) to render the annotations.

It is foreseen that annotations and corresponding annotation code for their operation may be produced by independent users of the system, in order to extend the universe of types of annotation or annotation-based services available. Similarly for annotation space types, which will also be extensible.

Notation

We're using set notation to explain how the invention works. This notation and its translation onto computer hardware will be well-understood by computer science practitioners.

Some examples of this notation:

$A \equiv \{x, y\}$ A is a set containing x and y $A \equiv \{x^*\}$ A is a set containing 0 or more x's.

$x \in A, A \subseteq Y$ x is an element in set A, which is a non-strict subset of set Y $A = \{x: B(x), C(y) > 5\}$ A is a set of all x's such that B(x) [the value of the logical predicate or function B applied to x] is true, and the value of the numerical function C applied toy is greater than 5. The range of x and y will be explicit or implied from the context.

A≡<x,y, . . . > A is a tuple or data structure containing at least elements x and y.

A.x the x component of the data structure d

In general, where a process is described, a conforming instance of the process may derive rather than store information as specified, make communications efficient by caching or eliding values, or may use constant values for some features to implement a subset of the generality available to the preferred instantiation. Other variants involve performing essentially equivalent calculations or processes further up- or down-stream of where they are specified in the preferred implementation.

The mapping between the set notation used here to describe procedures and computer executable SQL (standard database query language) queries running on a database-backed implementation of the methods described, for example but not limited to Postgres or MySQL, is straightforward and will be obvious to an experienced practitioner of relational database coding.

Terms

Ref Reference. An address by which a referenced document is known. On the web, for instance, that would be a URL or universal-resource-locator. In a file system, this might be a fully-qualified-filename.

Annotation Annotations. Text, multi-media, graphical symbols, or programmatic snippets producing a visual effect on a display or displays or constrained portion of a display or displays.

Methodology

The following mechanisms, shown in FIG. 2a are needed to implement the invention:

A. Transform a reference request into a displayed, annotated document, see FIG. 2b.

B. Add, delete, or modify an annotation.

C. Navigate the document space using annotations

D. Adding, deleting, creation annotation spaces

E. Annotation space sharing

F Creation and interaction with site-views

G. Per-user customized, integrated search of Reference Documents and Annotation Spaces Procedure A. Fetch and display the annotations associated with a Ref as a result of a user requesting the reference document. Shown in FIGS. 2, 7, and 8.

A.1. BROWSER (1.3) receives a request for a Ref as a result of USER 1.9 interaction or action internal to the BROWSER (1.3).

A.2. BROWSER (1.3) fetches contents of the document referred to by Ref. This is current art. In the case of a Web browser, this includes, but is not limited to, http:, https:, ftp: and file: protocol requests. In the case of a file system document, it is a standard read. In some instantiations, the BROWSER (1.3) may consult the ANNOTATION CLIENT (1.4) to determine whether a cached copy should be used instead of the original, and do that using techniques well-established in the literature. The ANNOTATION CLIENT (1.4) in this case will transmit the identity of the Ref to the ANNOTATION SERVER (1.10) which will respond with the modified Ref for the cached copy.

A.3. Generate Candidate References.

During this procedure, the ANNOTATION CLIENT (1.4) creates potential pairs of references and data that might be needed by the ANNOTATION SERVER (1.10) in order to find appropriate annotations. The inputs are the originally requested reference, and, in certain cases, the contents of the referenced document (or its cached version).

Figure 8:
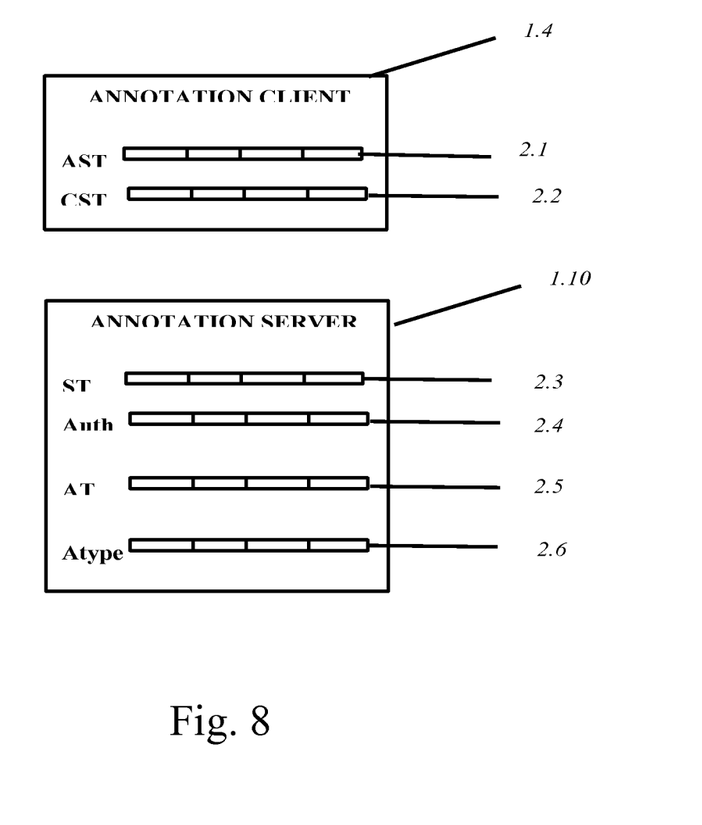
FIG. 8 is an illustration of the annotation client and annotation server structures and data fields.

The ANNOTATION CLIENT (1.4) maintains an active space table (AST):

AST≡{<space_id, Match( ), Transform( ), content_neededp, . . . >} in which:

space_id=unique identification of an annotation space

Match(ref)=a predicate, this rule applies to refs content_neededp=true or false. Whether referenced document content is used in Transform( )

Transform(ref, referenced document content)→{<tref, data>*} if content_neededp

Transform(ref)→{<tref, data>*} if not content_neededp in which:

tref=transformed reference and uses it to create

{<s, tref, data>: a∈AST, s=a.space_id, then with a:
  Match(Ref),
  ((content_neededp, <tref, data>∈Transform(Ref, document content)
    or
  (not content_neededp, <tref, data>∈Transform(Ref))

In some cases, Match( ), and Transform( ) might use ancillary data local to the space or global to the ANNOTATION CLIENT (1.4), which can be updated by the code update step in A.X.

Examples of this mechanism in operation include:

the null case, where a ref is unmodified and no data is passed on: Match(anything)=true, Transform(ref)=<ref, null> pulling a user name from a Ref and generating additional refs, as in:

Match(http://foo.com?user=alice)=true

Transform(http://foo.com?user=alice)={
  <http://user.alice.com, null>
  <http://users.com, alice>
  <http://foo.com?user=alice, null>}

A.4. The ANNOTATION CLIENT (1.4) sends candidate references and data tuples to the ANNOTATION SERVER (1.10). This uses established practices, and, where possible, is done asynchronously so as to allow maximum parallelism in the system's operation.

A.5. The ANNOTATION SERVER (1.10) finds all annotations applicable to the candidate references and data, for the given client identity, subject to the permission to read the annotation. It then returns all the relevant annotations, as well as updates to the code for the space (which can be used to update the corresponding Match( ) and Tranform( ) functions in A.4), and updates to the general purpose code of the ANNOTATION CLIENT (1.4) and HELPER (1.6) components.

Procedure A.3 generates a series of <space_id, tref, data>tuples. In this step, a client_id is used which is generated by well known means which might include maintaining and consulting a cookie on the client side and/or requiring a login and authentication.

The ANNOTATION SERVER (1.10) maintains a Client Space Table (CST):

CST≡{<client_id, space_id, . . . >*}

And a Spaces Table (ST):

ST≡{<space_id, Auth( ),Annotations( ), space_cd, . . . >*} in which:

Auth(client_id)→{read, write, modify, owner, grant, . . . } is a function implementing one of the many standard sorts of authorization schemes, including but not limited to those allowing for the management of transitive rights.

Annotations(client_id, ref, data_match)→{annot_id*} where:

annotation≡<annot_id, annot_content, {Ref*}, annot_cd, annot_lyout, annot_type, annot_auth . . . >*} is a mapping of the client, reference and additional data to an annotation with its identity, type, code needed to display it, additional layout information, the authorization information for this client, and similar associated data. Annot_lyout will include the location of the annotation relative to document elements and to the display window for the annotation in the case of "buried" annotations as described above. An annotation also includes a list of references to which it applies.

All annotations in the system, represented as an annotation tuple above, are contained in an ANNOTATION TABLE (AT) in the ANNOTATION SERVER (1.10).

The ANNOTATION SERVER (1.10) uses these to generate:

<{space_id, annotation, space_code>*}, general_code>
such that:
  c∈CST, c.client_id=client_id,
  s∈ST, s.space_id=c.space_id, read∈Auth(client_id),
  annotation∈Annotations(client_id, ref, data),
  space_cd=s.space_cd,
  general_code≡system wide code and status updates to the client side components Examples of the Annotation function for a particular space can be as simple as finding a text annotation accessed via the Ref, to as complex as searching an external database using information gleaned from the ref transformed in some way, and augmented by the data. An example of the latter might include searching data for mention of a restaurant name, and then finding the review of that restaurant on a third-party site, and returning that as an annotation, formatted according to a space specific XSLT transformation.

A.6. Return annotations and updates to ANNOTATION CLIENT (1.4).

Standard, potentially asynchronous, inter-process communication is used.

A.7. ANNOTATION CLIENT (1.4) installs updates into AST. The ANNOTATION CLIENT installs the new code and data either replacing or in sequence with existing code and data, depending on tags which accompany the code and data. Updates includes code and data specific to an annotation, an annotation type, a space type, a space, and general code modifying specific operation of the ANNOTATION CLIENT (1.4) as a whole.

A.8. Compose and layout annotations. Many techniques exist for performing these operations, including, but not limited to, constraint based methods, style-sheet based methods. In the preferred instantiation of the invention, the ANNOTATION CLIENT (1.4) will maintain a set of style sheet transformation templates in XSTL and/or CSS which may be updated in A.7. These will impose an order on sets of annotations, exclude repeated elements in the display of multiple annotations, and introduce the user-interface elements required for the navigation among annotations described above.

A.9. Display. Annotations (1.3) will be rendered according to well-known methods. In the preferred instance, the BROWSER's rendering engine will render and control the user-interface elements expressed in HTML, DHTML, XHTML, or similar markup language. During this process the annotation's display location is determined by consulting the annot_lyout data associated with the annotation, if present. If the annotation is a "buried" annotation, the layout will include references to document elements and display location elements relative to which the placement will be done.

Figure 4:
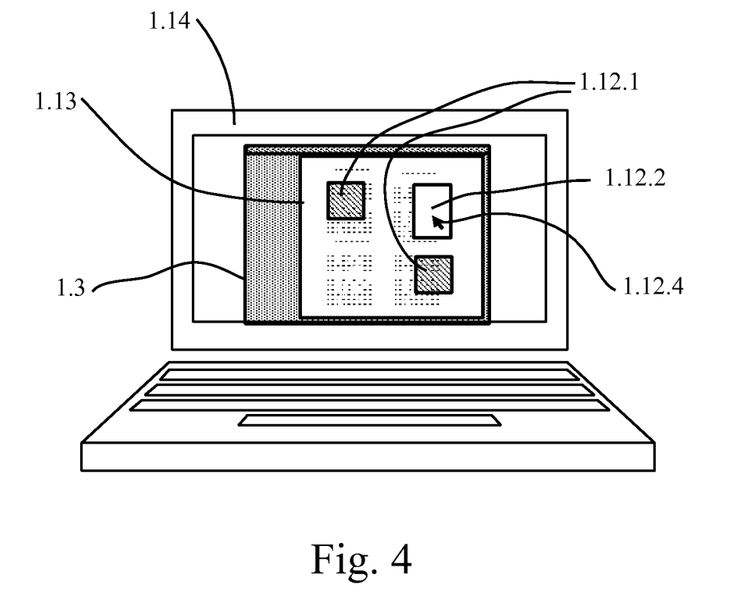
FIG. 4 is an illustration of the unobtrusive presentation of annotations.

Though the annotation system may be instantiated to render the annotations in various ways, the preferred instantiation will cause them to be rendered in such a way that they are semi-transparent, with a degree of user-definable transparency, overlayed on the contents of the referenced documents.

When the user begins to interact with the annotations, which may be indicated by moving the mouse pointed into the area where the semi-transparent annotations are displayed, or by the user invoking through another interface or through the keyboard some annotation related function, the annotation will become opaque or almost opaque, making it simple to see and work with the annotation.

A provision is foreseen in the user-interface for the hiding and unhiding in the display of all annotations at one time, using any of the well-known user interface techniques applicable, but preferably through the use of a user-interface button element. The button may also be used to notify the user that an annotation exists for a displayed document, by changing its colors or flashing it or otherwise distinguishing its state. The button may also be used to bring up a configuration panel for the user's state, for example by "double clicking" or "bringing up a right-button menu" or other similar and well-established user-interface practices.

Annotations of certain types may also override (in the annotation code passed back the ANNOTATION CLIENT (1.4) with the annotation) their opacity or placement behavior to tailor their behavior.

B. Add, delete, or modify an annotation. Shown in FIGS. 2B, 7, and 8.

The USER (1.9) interacts with the displayed form of the annotation in order to perform these operations. Authorization is checked either by referring to the annotation_auth tuple for the annotation, as discussed in A.5. The ANNOTATION CLIENT (1.4) may also communicate with the ANNOTATION SERVER (1.10) to determine a fresh value for the relevant permission. If the USER (1.9) does not have permissions, the user-interface elements required to perform these operations may be elided from the DISPLAY (1.14), making it impossible for the user to attempt unauthorized operations on the annotation A preferred instantiation could have a small "add" "delete" "edit" button on the annotation display. Other similar mechanisms from the art may be used equivalently.

Adding an annotation involves entering the appropriate data items from the annotation text into the ANNOTATION TABLE (AT), such that the client_id of the annotations' author is used as the owner_id, the annotation content is taken from the text and graphics of the annotation, the references are specified explicitly as URL's or scanned from the contents of the annotation, the annot_cd and annot_layout are derived from the ANNOTATION_TYPE table for the type or types specified for the annotation by the author.

Figure 3:
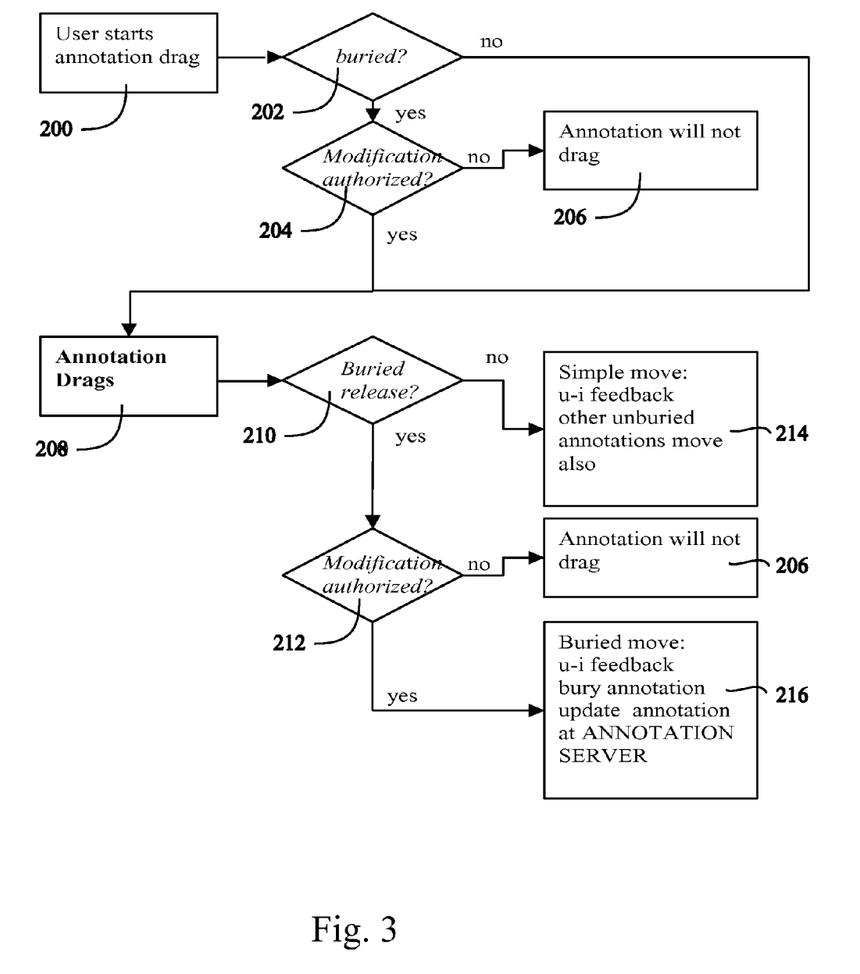
FIG. 3 is a flowchart for burying or unburying annotations.

Moving an existing unburied annotation to a new location will cause all unburied annotations to be relocated to the same new position on the display relative to the BROWSER (1.3) or application in which the annotation is being displayed and relative to the document. Burying an annotation will cause the annotation to be modified and an update to be sent to the ANNOTATION SERVER (1.10) updating the annotation's layout information. An annotation for which the user has no authorization to make a modification will not allow itself to be buried if it is not buried, nor will it allow itself to be unburied if buried. This is illustrated in FIG. 3.

Burying and unburying an annotation will be done preferentially by moving an annotation using a user-interface such as a mouse. An annotation will become buried when the mouse is moved back and forth quickly over a small space just before the mouse button is released, simulating the action of "pushing the annotation into the screen." A move without that final motion unburies the annotation (and correspondingly causes all other unburied annotations to move to a location corresponding to the one being moved on their own documents in their own BROWSER (1.3) display surfaces). Visual feedback of burying and unburying will be provided, potentially, though not exclusively, in the shadow cast by the annotation.

C. Navigate the document space using annotations. Shown in FIG. 5.

Simple navigation among annotated spaces which may be done from the annotation itself involves (i) intra-reference (ii) inter-reference (iii) linked annotations (iv) chronological or other ordered navigation. In the preferred instantiation, the display for an annotation may include buttons or other user-interface elements (handled by the ANNOTATION RENDERER (1.6) or ANNOTATION HELPER (1.7) components or by BROWSER (1.3) mechanisms operating on user-interface elements set up by these) to assist in these forms of navigation.

(I) Involves finding the next annotation which applies to the same reference. This is done by consulting the annotations that were last returned from the ANNOTATION SERVER (1.10) for this reference, but a refresh of results or a query as to whether these have changed may be performed at this time.

(II) Involves the selection from inside the annotation of an embedded reference to another base document, which results in generation for a new Ref which is then dealt with according to procedure A. for resolving references to annotated documents.

(III) Navigation to a reference to another annotation url (the target) embedded in the current one. This is a special kind of reference which is resolved by the ANNOTATION SERVER (1.10) by returning to the annotation client an annotation, including a list of References to which it applies. The ANNOTATION CLIENT (1.4) then requests one of the base references to which that annotation applies, and starts the Reference resolution process in A, but the annotation display starts at the target annotation which began this process.

(IV) This is treated as if it were case (III) just above, except that the annotation link may not need to be explicitly present in the original annotation.

More complex navigation, such as other sorting orders, search based annotation may be done from the annotation itself, using mechanisms based on the ones described above, or it may be based on functions available from the site-view of the annotation space. In either case, all navigation reduces to the cases in (II) and (III) just above.

D. Adding, deleting, creating and modifying annotation spaces and types. Shown in FIGS. 2B, 7 and 8.

These operations may be done from a dedicated website control panel created for that purpose, after proper user identification and authorization. Spaces and their types may be picked from a list of pre-provided types and spaces, or created using dedicated tools allowing for customization of the spaces.

In addition, an interface to the ANNOTATION CLIENT (1.4), akin to a BROWSER (1.3) toolbar or extension for the common Internet browsers, can be provided to perform some of these operations locally, with appropriate updates being sent to the ANNOTATION SERVER (1.10) where the permanent record of these spaces is maintained.

An interface is provided which allows the establishment and modification of named annotation types, which are entered into and maintained in the ANNOTATION TYPE TABLE (AType), and the association with formatting code and layout information in any one or more of the standard forms, including but not limited to Javascript, XSLT, XPath, and CSS.

E. Annotation space sharing.

The common sharing metaphors are supported, including email, im, etc. In addition, the system will support the creation of URL's or references referring to spaces, which when browsed have the effect of adding the viewing user to a space automatically, with or without opt-in.

The invention will also support the creation and promulgation via sticki, email, im or other social collaborative platform, of URLs that refer to an annotation. Navigation to that URL will also add the viewing user to the space of the annotation, with or without opt-in provisions, as deemed appropriate for the use-case.

Annotations may be added to multiple spaces, and contain "invitations" to join a subset of those spaces.

F. Creation and interaction with site-views

Patterns are used to merge content from annotations dynamically (or statically) into one or more websites or site-view documents, which may have additional content from other websites/site-views or independent sources. Example patterns could be j avascript augmented XSTL, combined perhaps with CSS. The site-view document will have its own reference to make it accessible as a reference document, and in the preferred instantiation, a user-interface element attached to the annotations shown will allow for fast switching from the annotated document view to the site view perspective.

The site view may be hand-crafted, built automatically using a template and rules, or some combination thereof. The site views may be tailored for individual USERS 1.9, as identified by their client_id, described above, and their content may depend on the content of the annotations shown or some or all of the USER's annotation production and consumption.

G. Search for strings matching content of either the annotations or the pages to which they refer. Shown in FIGS. 7 and 8.

Given that a user of the system described here has an individualized view of annotated spaces containing all the annotations and referenced documents in all the spaces which the user has chosen or is authorized to see, it is important to be able to search this space. The method described here is used to find all annotations and pages which contain a string match for a given string or string pattern within all those annotations and referenced documents. The user of the invention can select whether to run the method over just the annotations (G.1), just the references (G.2) or both, and the results can be displayed accordingly. The string can be a textual string, or a pattern in any of the many well-known and understood pattern specification syntaxes, for example standard regular-expression syntax.

Search(client_id, string)→{<a: annotations>*∪<r: references>*}:
  G.1: a∈Annotation_Table, ast∈AST, c∈CST,
  client_id=c.client_id, c.client_id=ast.client_id,
  st.space_id=ast.space_id,
  read∈st.Auth(client_id),
  st.annot_id=a.annot_id,
  StringMatch(string, a.annot_contents)
  ∪G.2: r=a.reference,
  StringMatch(string, Contents(r))
in which
  Contents (reference)=the contents of the referenced document identified by reference
  StringMatch(pattern, content)=a standard pattern/content matching function from any of the many well established ones as described above, for example Textual Regular Expressions.

In some instantiations of the invention, rich-media annotations, may be searched for by replacing string with a pattern specification for the rich-medium from any of the types well-established in the art, and replacing the StringMatch function with a suitable rich-media pattern recognition function.

Alternate Embodiments

The preferred instantiation above is not the only way such an annotation system may be built. Variations involve:

Caching the current contents of a reference document and replacing the cached contents and relevant annotations for the up to date reference document.

Modifying the original reference document, when such access to it is available, with markers or code to assist in the access of annotations relating to it.

The entire system could operate in a non-networked environment with all accesses occurring locally.

The annotations might be displayed by a separate helper application, possibly without access to the contents of the referenced page.

The annotation server might use a separate database of correspondences among documents and their types to decide which annotations refer to a document. In this case annotations are "dynamically" assigned to referenced documents based on outside information about the documents or their categories.

Annotations may contain patterns, geometric descriptions, or other information allowing them to be located at a precise location within a document. They will then scroll and pan with the document contents.

Some types of supported annotation may apply to and provide a snapshot version of the document or one within a range of dates, providing a snapshot or means of retrieving one when needed.

The operation of the entire system or parts of it might be done programmatically through an API or by capturing information presented by well-known methods, in order to provide a higher order service or a different presentation interface.

Annotations may include multi-media content, with either integrated or separate controls for their playback. Playback may be programmatically controlled using the mechanisms described above.

Annotations may include a subset of the navigation options specified in section C, or they may provide additional navigation options common in the art of searching and sorting.

Navigating the space of the annotations may be done through user-interface provided in the annotations or separate from it, and may be programmatically specified in the annotation using the mechanisms described above.

The components of the system may all reside on a single computer or dedicated electronic device, or they may be split across several pieces of hardware statically or dynamically.

There may be more than one ANNOTATION SERVER (1.10), in the system, and the identity of the space can be used to identify the particular ANNOTATION SERVER which will service a particular space of annotation types. A common or customized directory service can be used to maintain the association between the annotation space and servers handling it.

More than one instance of the ANNOTATION CLIENT (1.4) and other client side components may be present, so that in effect multiple annotation engines may be operating simultaneously on the same referenced documents, each with its own annotations, rules, and interfaces. The layout components of the ANNOTATION CLIENT will take into account this possibility, and ensure that the annotations are laid out in such a way as to not interfere with one another.

Redundant components may be introduced into the system in order to achieve great robustness against failure, using techniques common in the art.

A version of the system allowing for an off-line capability may be implemented by pre-fetching information that will be needed for off-line functionality, and queuing or disabling updates while off-line. These modifications are well-understood in the art.

The annotation spaces to which a client belongs may be further filtered by date, author, subject or other information, so as to limit the annotations which will be displayed. Such filtering can be done using established methods.

Spaces may be made to form an inclusion hierarchy, in which case the rules to match spaces in procedure A.5 are modified to take into account the hierarchy in determining a match.

Space types may be augmented with attributes or tags, and a client space may be constituted by a logical combination of these attributes, with consequent modification of the matching functions in A.5 to evaluate the logical combination and the enhancement of the search space to all spaces, rather than just the ones in the CST in A.5.

The burying/unburying interface techniques may be used for user-interface elements other than the annotations specified here, as well as a component of inventions not implementing annotation overlays.

Burying may be used to implement different and well-known user interface interactions, such as but not limited to copying, deletion, transformation of kind, and so on of an element displayed and draggable in a user-interface. A variant of burying includes deep-burying, in which the burying motion is intensified by repetition. Different patterns of motion could also be specified to perform different actions on the user interface element of controlling program.

We claim:

1. A system for augmenting computerized documents with annotations, comprising:
   an annotation client with instructions to:
      receive a document from a browser;
      identify a set of references from the contents of the document to find relevant annotations;
      send the set of references to an annotation server;
      receive annotations associated with the set of references from the annotation server; and
      customize the annotations for display according to a user's interests; and
   an annotation renderer with instructions to:
      render the customized annotations in the document for display; and
      modify the rendering of the customized annotations according to a user's preferences and interactions with the annotations and the document;
   wherein the annotation client and the annotation renderer reside in at least one computer or electronic device.

2. The system of claim 1, wherein the document comprises a collection of information displayed on the browser.

3. The system of claim 1, wherein the annotations are selected from at least one of: notes; drawings; images; video; sound; services; applications; services; and advertising.

4. The system of claim 1, wherein the annotations are stored separate from the document.

5. The system of claim 1, wherein the annotation client further comprises instructions to compose the annotations and prepare them for the annotation renderer.

6. The system of claim 1, wherein the annotations comprise navigable annotations.

7. The system of claim 1, wherein the annotation client further comprises instructions to add, delete, and modify the annotations.

8. The system of claim 1, wherein the instructions to render the annotations in the document for display comprise instructions to overlay semi-transparent annotations on associated references in the document.

9. The system of claim 1, wherein the instructions to modify the rendering of the annotations comprise instructions to make the annotations opaque in response to the user's interactions with the annotations.

10. The system of claim 1, wherein the instruction to modify the rendering of the annotations comprise instructions to fix the annotations to a visual position in the document.

11. The system of claim 1, wherein the annotation client further comprises instructions to augment the set of references by using ancillary data local to an annotation space to which the annotation client belongs.

12. The system of claim 1, wherein the annotation client further comprises instructions to augment the set of references by using ancillary data global to the annotation client.

\* \* \* \* \*